United States Patent
Anderson et al.

(10) Patent No.: US 9,593,723 B2
(45) Date of Patent: Mar. 14, 2017

(54) DISCONNECT CLUTCH

(71) Applicant: Caterpillar Inc., Peoria, IL (US)

(72) Inventors: Michael Douglas Anderson, Germantown Hills, IL (US); Megan Alissa Brinkmeyer, East Peoria, IL (US); Daniel P. Sergison, East Peoria, IL (US); Thomas Alan Brosowske, Dunlap, IL (US); Grant Steven Peterson, Metamora, IL (US); Michael G. Cronin, Peoria, IL (US); Raymond B. Derer, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 170 days.

(21) Appl. No.: 14/507,269

(22) Filed: Oct. 6, 2014

(65) Prior Publication Data

US 2016/0097429 A1  Apr. 7, 2016

(51) Int. Cl.
| | |
|---|---|
| *F16D 25/0635* | (2006.01) |
| *F16D 25/063* | (2006.01) |
| *F16D 25/0638* | (2006.01) |
| *F16D 13/58* | (2006.01) |

(52) U.S. Cl.
CPC ....... *F16D 25/0635* (2013.01); *F16D 25/063* (2013.01); *F16D 25/0638* (2013.01); *F16D 13/583* (2013.01)

(58) Field of Classification Search
CPC .................................................. F16D 25/063
See application file for complete search history.

(56) References Cited

U.S. PATENT DOCUMENTS

| | | | | |
|---|---|---|---|---|
| 2,694,478 A | * | 11/1954 | Zeidler | F16D 25/0635 192/70.18 |
| 4,193,485 A | * | 3/1980 | Johns | F16D 25/087 192/85.15 |
| 4,708,229 A | | 11/1987 | Anderson et al. | |
| 5,435,797 A | * | 7/1995 | Harris | B60W 30/18 192/109 F |
| 5,651,436 A | * | 7/1997 | Sommer | B30B 15/10 192/12 C |
| 8,387,767 B2 | | 3/2013 | Komorowski et al. | |
| 2002/0000356 A1 | * | 1/2002 | Bjorkgard | F16D 25/0635 192/85.58 |
| 2011/0146261 A1 | | 6/2011 | Tevis et al. | |

(Continued)

*Primary Examiner* — Ramya Burgess
*Assistant Examiner* — Timothy M Hannon
(74) *Attorney, Agent, or Firm* — Miller, Matthias & Hull; Jeff A. Greene (57) ABSTRACT

A disconnect clutch and method of controlling the connection of a parasitic load to an engine disposed on a machine is disclosed. The disconnect clutch may comprise a flywheel assembly, a friction plate and a coupling. The flywheel assembly may include a flywheel having a cavity, a chamber, a piston moveable between a contracted position and an expanded position, a pressure plate, a lever, and a coupling operably connected to the friction plate. The flywheel may include an end plate. The chamber may be defined by the flywheel and the piston. The lever may apply an activation force to the pressure plate when the piston is in the expanded position. The friction plate may be attached to and rotatable with the flywheel assembly when the piston is in the expanded position and generally stationary when the piston is in the contracted position.

17 Claims, 7 Drawing Sheets

(56) References Cited

U.S. PATENT DOCUMENTS

| | | | |
|---|---|---|---|
| 2011/0168516 A1* | 7/2011 | Takei | F16D 25/088 |
| | | | 192/85.63 |
| 2012/0204548 A1 | 8/2012 | Turnis et al. | |
| 2013/0256075 A1* | 10/2013 | Walker | F16H 41/24 |
| | | | 192/3.29 |
| 2014/0014459 A1 | 1/2014 | O'Donnell et al. | |

* cited by examiner

DISCONNECT CLUTCH

TECHNICAL FIELD

The present disclosure generally relates to engines and, more particularly, relates to a disconnect clutch for controlling the connection of parasitic loads to engines.

BACKGROUND

Diesel engines are used in a wide variety of industrial applications. These engines are known as compression ignition engines because they are internal combustion engines that utilize the heat of compression to ignite the diesel fuel in the combustion chamber of the engine.

Diesel engines can, from time to time, experience difficulties when starting, particularly in cold ambient temperatures. One contributing factor is the continuous parasitic loads placed on the engine during startup.

U.S. Pat. No. 4,708,229, issued on Nov. 24, 1987, discloses a drive that permits engine driven accessories to be momentarily disengaged from the engine during startup. This type of design has structural drawbacks and does not allow for disengagement of accessories during engine idling. A better design is needed to control the connection of parasitic loads during startup and idle.

SUMMARY OF THE DISCLOSURE

In accordance with one aspect of the disclosure, a disconnect clutch is disclosed. The disconnect clutch may comprise a flywheel assembly, a friction plate and a coupling operably connected to the friction plate. The flywheel assembly may include a rotatable flywheel having a cavity, a chamber, a piston, and a pressure plate. The flywheel may include an end plate. The chamber may be disposed inside the cavity and may be defined by the flywheel and a piston. The piston may be disposed inside the cavity and is moveable between a contracted position and an expanded position. The pressure plate may be disposed inside the cavity. The friction plate may be disposed inside the cavity between the pressure plate and the end plate. The friction plate may be attached to and rotatable with the flywheel assembly when the piston is in the expanded position and spaced apart from the flywheel assembly and generally stationary when the piston is in the contracted position.

In accordance with another aspect of the disclosure, a method of controlling the connection of a parasitic load to an engine disposed on a machine is disclosed. The method may comprise rotating a flywheel assembly connected to the engine. The flywheel assembly having an interior and including a flywheel, a piston and a chamber disposed in the interior. The chamber may be defined by the flywheel and the piston. The method may further comprise connecting the engine to the parasitic load by applying an activation force to attach a friction plate disposed inside the interior of the rotating flywheel assembly to the rotating flywheel assembly. The friction plate is operably connected to the parasitic load. The activation force is generated by movement of the piston to an expanded position by fluid contained in the chamber, the fluid acting under centrifugal force produced by the rotating.

In accordance with a further aspect of the disclosure, a disconnect system operably coupled to an engine disposed on a machine is disclosed. The disconnect system may comprise a disconnect clutch that includes a flywheel assembly, a friction plate, and a coupling. The flywheel assembly may include a rotatable flywheel having a cavity, a chamber disposed in the cavity, a piston disposed in the cavity, a pressure plate disposed in the cavity, and a lever disposed in the cavity between the piston and the pressure plate. The flywheel may include an end plate. The chamber may be defined by the flywheel and the piston. The piston may include a nub, and is moveable between a contracted position and an expanded position. The pressure plate may include a protrusion. The lever may be oriented in relation to the piston and the pressure plate to magnify a contact force received from the nub and to apply an activation force to the protrusion when the piston is in the expanded position, the activation force greater than the contact force. The friction plate may be disposed inside the flywheel assembly between the pressure plate and the end plate. The friction plate is attached to and rotatable with the flywheel assembly when the piston is in the expanded position and disconnected from the flywheel assembly and generally stationary when the flywheel is rotating and the piston is in the contracted position. The coupling is operably connected to the friction plate and a parasitic load, wherein the parasitic load is connected to the engine when the piston is in the expanded position and the friction plate is attached to and rotating with the flywheel assembly and is disconnected from the engine when the friction plate is disconnected from the flywheel assembly.

DETAILED DESCRIPTION

Figure 1:
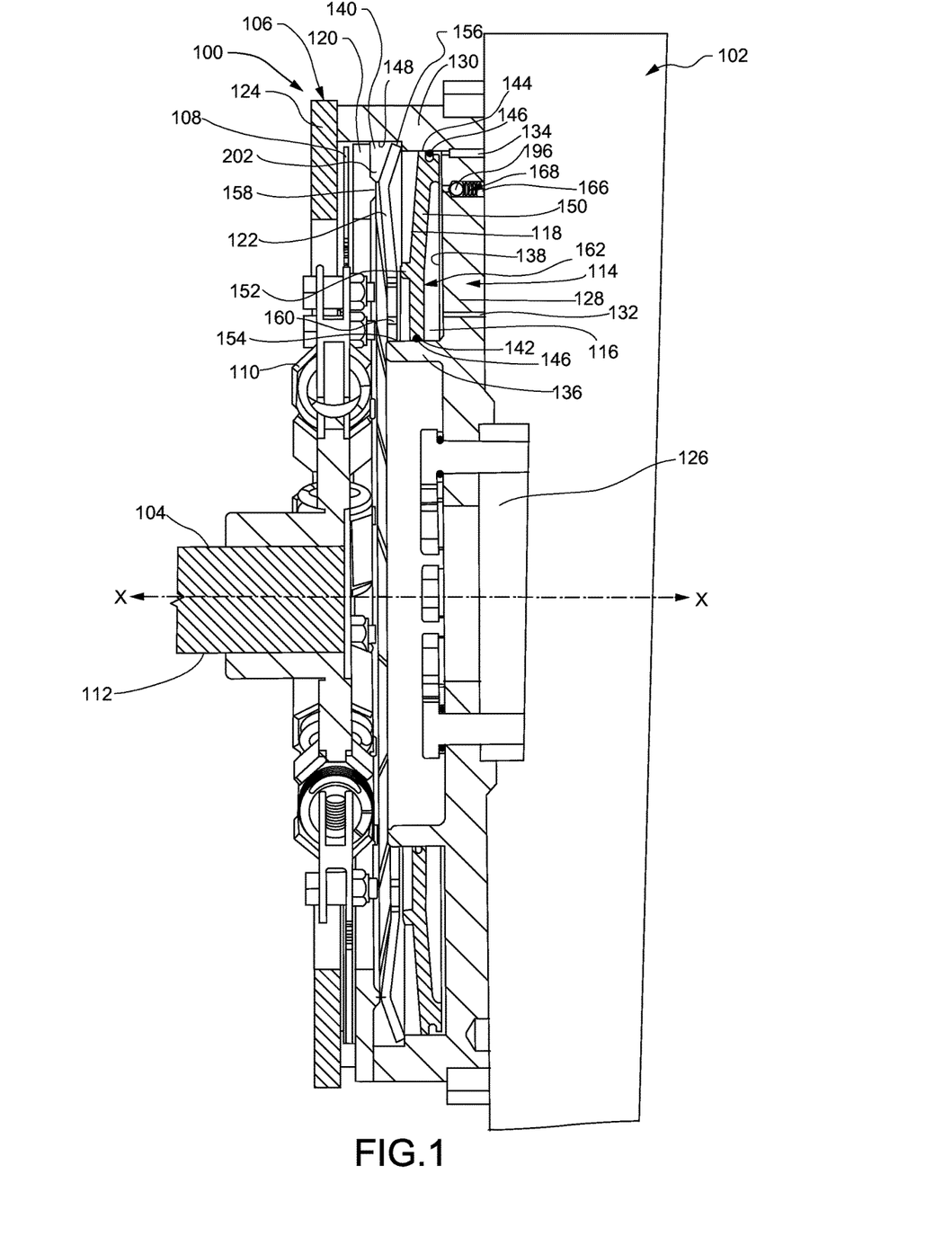
FIG. 1 is a cross-sectional view of an exemplary embodiment of the disconnect clutch with the piston in the contracted position.

Referring now to the drawings, and with specific reference to FIG. 1, there is shown a cross-sectional view of an embodiment of a disconnect clutch constructed in accordance with the present disclosure and generally referred to by reference numeral 100. The disconnect clutch 100 is attached to an exemplary engine 102. The disconnect clutch 100 may be attached to at least one parasitic load 104. While the following detailed description and drawings are made with reference to a disconnect clutch 100 for a truck engine 102 or an engine used in mining or construction machines, the teachings of this disclosure may be employed on other types of vehicles.

Figure 2:
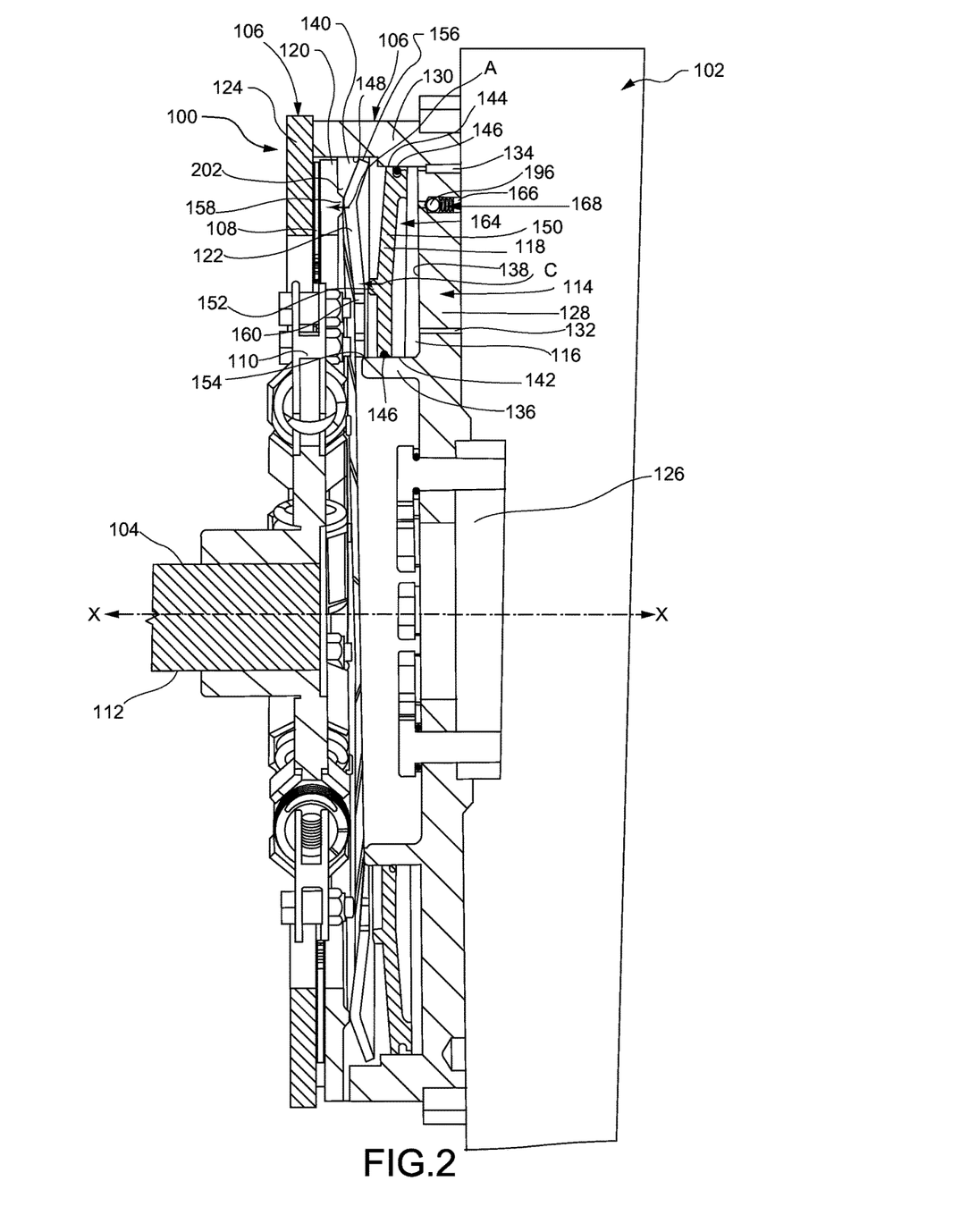
FIG. 2 is a cross-sectional view of the disconnect clutch of FIG. 1 with the piston in the expanded position.
Figure 3:
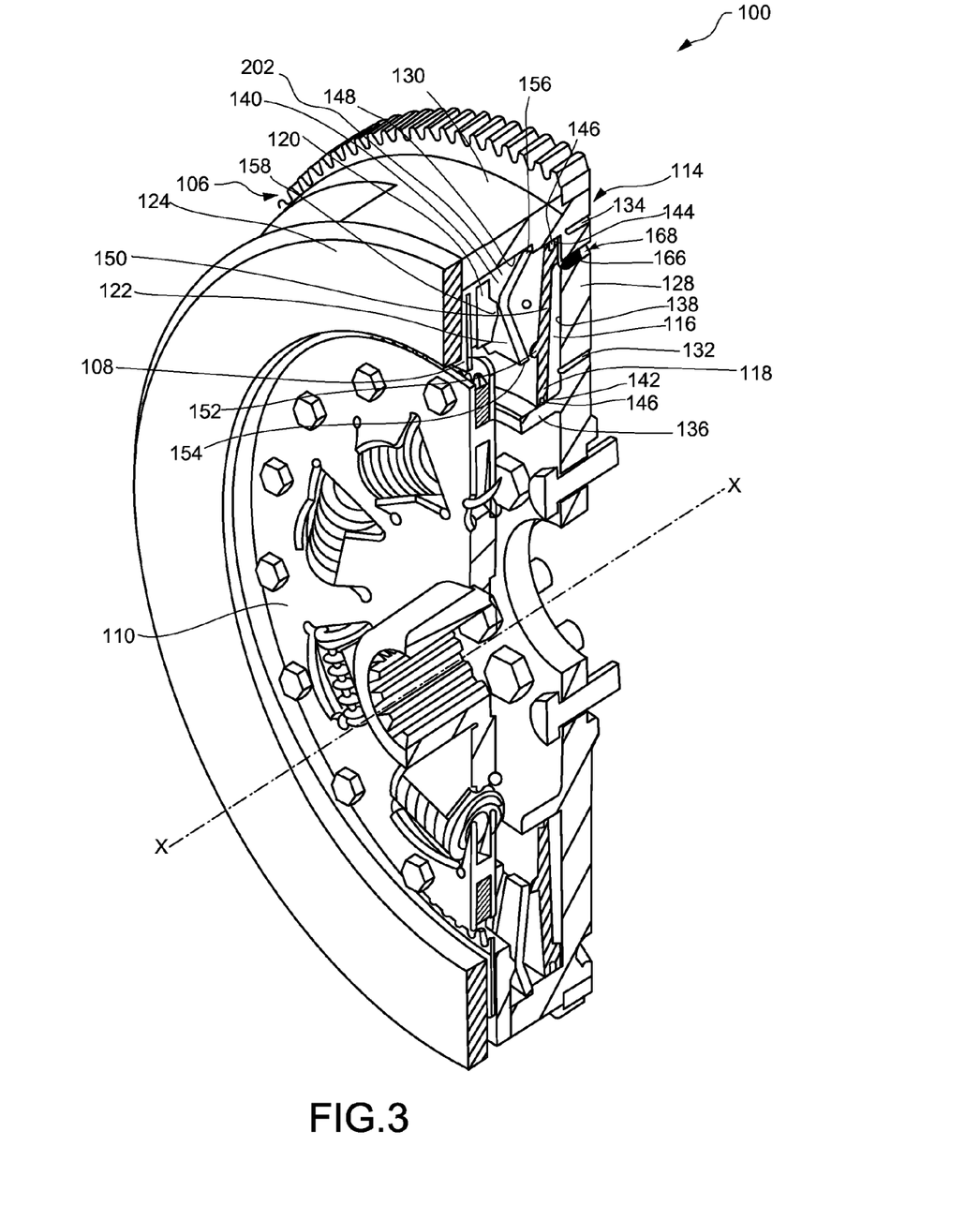
FIG. 3 is perspective view of the disconnect clutch of FIG. 1.

Turning now to FIGS. 1-3, the disconnect clutch 100 may comprise a flywheel assembly 106, at least one friction plate 108 and a coupling 110.

The flywheel assembly 106 is rotatable about an X-axis and may include a flywheel 114, a chamber 116, a piston 118, a pressure plate 120, and a lever 122. The flywheel assembly 106 is operably connected to the engine 102. In one embodiment, the flywheel 114 may be connected to the crankshaft 126 of the engine 102 and may rotate with the crankshaft 126.

The flywheel 114 may be annular and may define a cavity 202. The flywheel 114 may include a front member 128, a side member 130 and an end plate 124. The front member 128 may include therethrough a fill aperture 132 and a bleed aperture 134. In an embodiment, the bleed aperture 134 may be disposed in the front member 128 in a position proximal to the side member 130, and the fill aperture 132 may be disposed between the bleed aperture 134 and the crankshaft 126 of the engine 102. In some embodiments, the front member 128 may include a ledge 136 that extends from an inner face 138 of the front member 128 into the interior 140 of the flywheel assembly 106. The ledge 136 may be disposed adjacent to and under the piston inner circumference 142 and, in some embodiments, disposed under the lever inner circumference 154. The side member 130 may be generally annular and may be disposed between the front member 128 and the end plate 124. The end plate 124 may be annular in shape and may be attached to the side member 130. In some embodiments, the end plate 124 may be generally parallel to the front member 128.

The chamber 116 may be defined by the flywheel 114 and the piston 118. The piston 118 is moveable between a contracted position 162 illustrated in FIG. 1 and an expanded position 164 illustrated in FIG. 2. In other words, the volume of the chamber 116 between the front member 128 and the piston 118 can be contracted and expanded by movement of the piston 118.

The piston 118 is disposed inside the interior 140 of the flywheel assembly 106. The piston 118 may be annular in shape and have an inner diameter that defines a piston inner circumference 142 and an outer diameter that defines a piston outer circumference 144. The piston outer circumference 144 may be disposed adjacent to the interior surface 148 of the side member 130 of the flywheel 114, and the piston inner circumference 142 may, in some embodiments such as the one shown in FIGS. 1-3, be disposed adjacent to the ledge 136. In some embodiments, a seal 146 may be disposed around the piston outer circumference 144 to provide sealing engagement between the piston 118 and the interior surface 148 of the side member 130 of the flywheel 114, and another seal 146 may be disposed around the piston inner circumference 142 to provide sealing engagement between the piston 118 and the ledge 136. The piston 118 may be slidable along the interior surface 148 of the side member 130 of the flywheel 114 to allow for expansion of the volume of the chamber 116, and may be slidable along the ledge 136. The piston 118 may include a body 150 and a nub 152. The nub 152 may be disposed outside the chamber 116 and between the piston inner circumference 142 and the piston outer circumference 144. The nub 152 may extend outward from the surface of the body 150 of the piston 118 in a direction toward the lever 122. In some embodiments, the nub 152 may be disposed above, yet proximal to, the lever inner circumference 154. In other embodiments, the nub 152 may be positioned elsewhere (on the piston 118) in relation to the lever 122.

The pressure plate 120 may be disposed in the interior 140 of the flywheel assembly 106 between the friction plate 108 and the lever 122 and adjacent to the side member 130 of the flywheel 114. The pressure plate 120 may be mounted to the side member 130 of the flywheel 114. The pressure plate 120 may be annular in shape and may include a protrusion 158 that extends outward toward the lever 122.

The lever 122 may be generally annular in shape and have an inner diameter that defines a lever inner circumference 154 and an outer diameter that defines a lever outer circumference 156. In some embodiments, the lever inner circumference 154 may be disposed radially outward from the piston inner circumference 142. The lever 122 may be disposed in the interior 140 of the flywheel assembly 106 between the piston 118 and the pressure plate 120. In one embodiment, the lever 122 may be angular shaped. More specifically, in one embodiment, a portion of the lever 122 may be angled toward the protrusion 158 of the pressure plate 120 and another portion may be angled toward the nub 152 of piston 118. In another embodiment, the lever 122 may be generally flat in shape. In one embodiment, the lever 122 may include a plurality of spaced apart slits 160 disposed around the lever inner circumference 154. Each slit 160 may extend from the lever inner circumference 154 in a direction toward the lever outer circumference 156.

The lever 122 is oriented in relation to the piston 118 and the pressure plate 120 to apply an activation force A, as shown in FIG. 2, to the pressure plate 120 protrusion 158 when the chamber 116 volume is expanded and the piston 118 is in the expanded position 164. In some embodiments, the lever 122 may be oriented in relation to the piston 118 and the pressure plate 120 to magnify the contact force C received from the piston 118 at the nub 152 and to apply the activation force A to the pressure plate 120 protrusion 158 when the chamber 116 volume is expanded and the piston 118 is in the expanded position 164. The activation force A may be substantially the same as or (when magnified by the lever 122) greater than the contact force C. For example, in one embodiment, the activation force A may be in the range of about one time to about twelve times the contact force C. In another embodiment, the activation force A may be in the range of about five to about eight times the contact force C. In yet another embodiment, the activation force A may be about eight times the contact force C.

The disconnect clutch 100 may include one or more friction plate(s) 108 disposed in the interior 140 of the flywheel assembly 106 between the pressure plate 120 and the end plate 124. The friction plate(s) 108 may be annular in shape.

The coupling 110 may be operably connected to the friction plate(s) 108. In one embodiment (as best seen in FIG. 3), the coupling 110 may be an annular spring coupling 110, as known in the art. In an embodiment, both the spring coupling 110 and the friction plate 108 may be splined to provide a meshing connection between the two. In other embodiments, the coupling 110 may be a transmission (not shown) that is operably connected to the friction plate 108. The coupling 110 is operably connected to the parasitic load 104 (see FIGS. 1-2). Parasitic loads 104 may be accessory loads such as a steering pump, a fan hydraulic pump, a brake charging pump, an implement pump, a transmission, a transmission shaft, a torque converter, an engine cooling fan, and the like. In FIGS. 1-2, the transmission shaft 112 is a parasitic load 104. The transmission shaft 112 may be operably connected to other parasitic loads 104 such as a steering pump, a fan hydraulic pump, a brake charging pump, an implement pump, the transmission, a torque converter, and the like. The friction plate 108 is attached to and rotatable with the flywheel assembly 106 when the piston 118 is in the expanded position 164 (and the volume of the chamber 116 is expanded). The friction plate 108 is spaced apart from the flywheel assembly 106, more specifically, the pressure plate 120 and the end plate 124 of the flywheel assembly 106, when the piston 118 is in the contracted position 162 (and the volume of the chamber 116 is contracted). When the friction plate 108 is spaced apart from the pressure plate 120 and the end plate 124, the friction plate 108 is generally stationary even though the flywheel assembly 106 (including the pressure plate 120 and the end plate 124) may be rotating.

In some embodiments, the flywheel 114 may also include a relief aperture 166 and relief valve 168. In other embodiments of the disconnect clutch 100 similar to that of FIGS. 1-3 (and FIG. 4), the flywheel 114 may not include the relief aperture 166 and relief valve 168. As shown in FIGS. 1-3, the flywheel 114 includes the relief aperture 166 disposed through the front member 128. In one embodiment, the relief valve 168 may be fluidly connected to or disposed in the relief aperture 166. The relief valve 168 may include a relief member 196 moveable between an open position and a closed position. The relief valve 168 may be configured to move the relief member 196 to the open position when the pressure in the chamber 116 exceeds a threshold and to move the relief member 196 to a closed position if the pressure within the chamber 116 is below the threshold. In one embodiment, the relief valve 168 may be a spring/ball mechanical valve with a relief member 196 that opens based on hydraulic pressure to clip the transient spikes in pressure in the chamber 116. In other embodiments, the relief valve 168 may be a spool valve with a spring, or the like. The relief valve 168 helps to avoid over pressurization of the chamber 116 that might result in crushing of the friction plate(s) 108.

Figure 4:
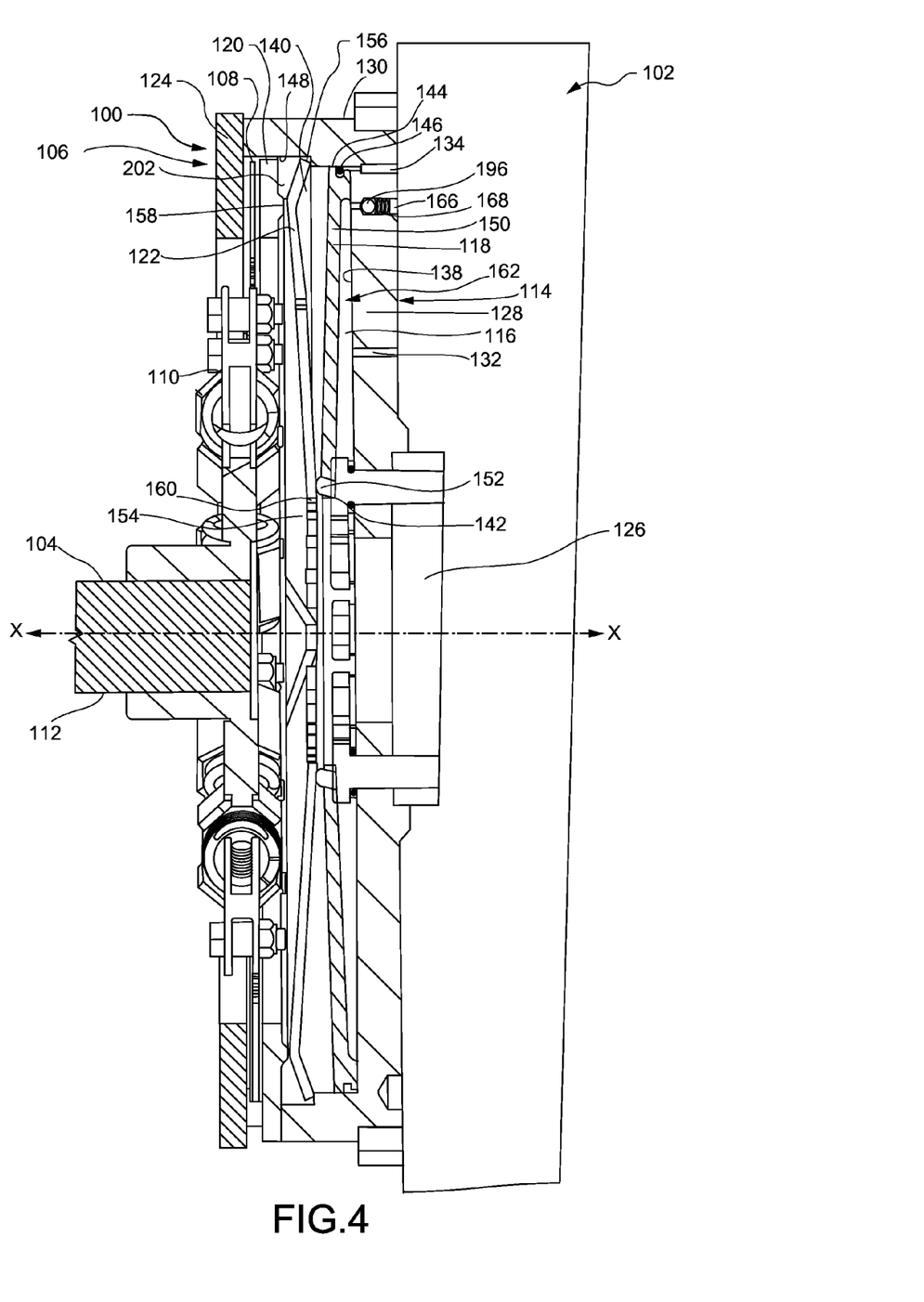
FIG. 4 is a cross-sectional view of another exemplary embodiment of the disconnect clutch with the piston in the contracted position.

Turning now to FIG. 4, therein is disclosed an alternative embodiment of the disconnect clutch 100. The embodiment is similar to that of FIGS. 1-3 except that the front member 128 of the flywheel 114 does not include the ledge 136 thus leaving the chamber 116 open at the bottom proximal to the piston inner circumference 142. In such an embodiment, there is no seal 146 disposed at the piston inner circumference 142, and the distance between the piston inner and outer circumferences 142, 144 may be greater than in the embodiment of FIGS. 1-2. Similarly, the distance between the lever inner and outer circumferences 154, 156 may be greater than in the embodiment of FIGS. 1-2. In addition, the nub 152 may be disposed adjacent to the piston inner circumference 142. While the relief aperture 166 and relief valve 168 are illustrated in FIG. 4, some embodiments similar to that of FIG. 4 may not include the relief aperture 166 and relief valve 168.

Figure 5:
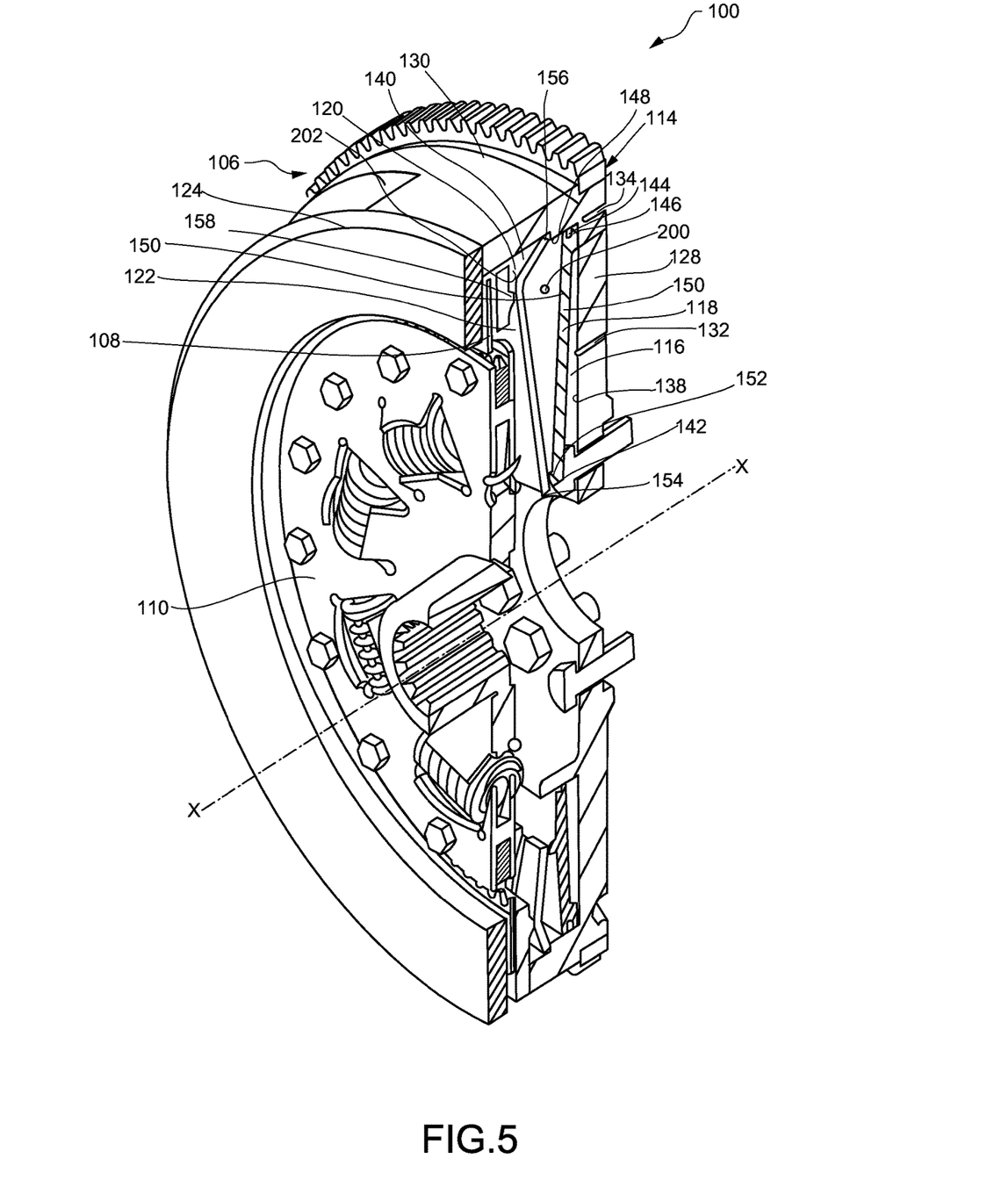
FIG. 5 is perspective view of a variation of the disconnect clutch of FIG. 4.

FIG. 5 illustrates a similar disconnect clutch 100 as that of FIG. 4 except that instead of a relief aperture 166 and relief valve 168, the piston 118 includes an outlet 200 therethrough. In one embodiment, the outlet 200 may be disposed below the nub 152 for pressure relief in the chamber 116. In other embodiments, the outlet 200 may be disposed elsewhere on the piston 118.

Figure 6:
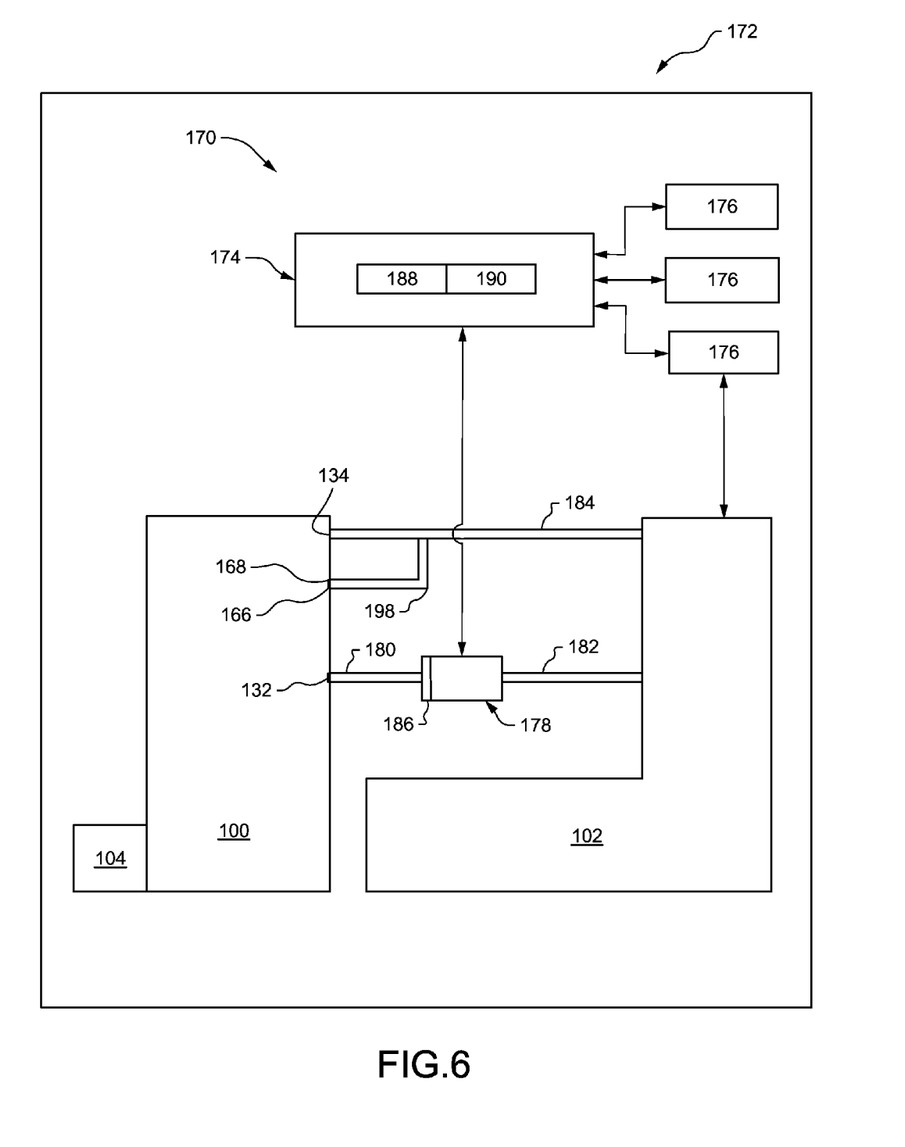
FIG. 6 is a schematic of the disconnect system on a machine.

In some embodiments the disconnect clutch 100 may be part of a disconnect system 170 on a machine 172 that includes an engine 102, as shown schematically in FIG. 6. The disconnect system 170 may be disposed on the machine 172 and may include the disconnect clutch 100 operably connected to the engine 102, a controller 174, one or more sensors 176, and a fluid supply valve 178.

The fluid supply valve 178 may be fluidly connected to the fill aperture 132 of the disconnect clutch 100 by a supply conduit 180 and fluidly connected to a fluid supply (for example, engine oil, other lubricating fluid, or the like) by a channel 182. In some embodiments, the bleed aperture 134 of the disconnect clutch 100 may be fluidly connected by a return conduit 184 to the fluid supply. The fluid supply valve 178 may be electronic and include a valve member 186 moveable between an open position that allows fluid to flow from the fluid supply valve 178 to the fill aperture 132 through the supply conduit 180, and a closed position that blocks the flow of fluid through the fluid supply valve 178 to the fill aperture 132.

The controller 174 may be operably connected to the fluid supply valve 178 and to the sensor(s) 176 connected to the engine 102 and/or a machine 172 to which the engine 102 is providing power. The controller 174 may be configured to receive data, from the one or more sensors 176, related to operational parameters for the engine 102 and/or machine 172 and to transmit, in response, a control signal to the fluid supply valve 178 to move the valve member 186 to the closed or to the open position based upon at least one engine 102 and/or machine 172 operational parameter detected by at least one sensor 176. The sensor(s) 176 may be those known in the art to detect and transmit operational parameter data for the engine 102 and/or machine 172 such as engine load, engine speed, machine implement or brake commands, machine start-up commands, transmission gear, pressure in lift circuits, parking brake activation/release, or the temperature of engine oil, engine coolant, hydraulic fluid, or the like.

The controller 174 may include a processor 188 and a memory component 190. The processor 188 may be a microprocessor or other processor as known in the art. The processor 188 may execute instructions and generate control signals for moving the valve member 186 to the open or closed position. Such instructions may be read into or incorporated into a computer readable medium, such as the memory component 190 or provided external to the processor 188. In alternative embodiments, hard wired circuitry may be used in place of, or in combination with, software instructions to implement a control method.

The term "computer readable medium" as used herein refers to any non-transitory medium or combination of media that participates in providing instructions to the processor 188 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 188 can read.

The controller 174 is not limited to one processor 188 and memory component 190. The controller 174 may be several processors 188 and memory components 190.

In one embodiment, the controller 174 may receive from sensors 176 data indicative of whether the transmission is in gear and/or the brake is released and process the data to determine that the engine 102 is transitioning to a work mode. In an embodiment, the controller 174 may receive data indicative of whether there is a physical operator lever command active for operation of a machine 172 implement and process the data to determine that the engine 102 is transitioning to a work mode. In an embodiment, the controller 174 may receive data indicative of whether there is an active command to start the engine 102, and may process the data to determine that the engine 102 is in start-up.

Also disclosed is a method of controlling a connection of one or more parasitic loads 104 to an engine 102 disposed on a machine 172. The method may comprise rotating a flywheel assembly 106 connected to the engine 102. The flywheel assembly 106 having an interior and including (disposed in the interior) a flywheel 114 having a fill aperture 132 and a bleed aperture 134, a chamber 116, a piston 118, a pressure plate 120, and a lever 122. The flywheel 114 and the piston 118 may define the chamber 116. The method may further comprise receiving fluid in the chamber 116 through the fill aperture 132, and connecting the engine 102 to the one or more parasitic loads 104 by applying an activation force A to attach a friction plate 108 to the rotating flywheel assembly 106, wherein the activation force is generated by movement of the piston 118 to an expanded position 164 by fluid contained in the chamber 116, the fluid acting under centrifugal force produced by the rotating. The friction plate 108 may be disposed inside the interior of the flywheel assembly 106 and is operably connected to the one or more parasitic loads 104.

In an embodiment, the method may further include disconnecting the engine 102 from the one or more parasitic loads 104 by draining at least a portion of the fluid from the chamber 116. The fluid may be drained through the bleed aperture 134.

In an embodiment, the pressure plate 120 may be disposed adjacent to the friction plate 108, and the lever 122 may be disposed between the piston 118 and the pressure plate 120. The method may further include applying, by the piston 118, a contact force C on the lever 122, the contact force C generated by movement of the piston 118 to an expanded position 164 by fluid contained in the chamber 116. In an embodiment, the contact force C may be less than the activation force A.

In another embodiment, the method may further include multiplying, by the lever 122, the contact force C received from the piston 118 to generate the activation force A applied to the pressure plate 120. In a refinement, the activation force A may be about eight times the contact force C.

In an embodiment, where the flywheel 114 includes a ledge 136 disposed under the piston 118, the method may further include receiving fluid into the chamber 116, and using centrifugal force and fluid supply pressure to move the piston 118 to an expanded position 164.

In another embodiment, the method may further include controlling the flow of fluid to the chamber 116 based on engine 102 or machine 172 operating parameters.

INDUSTRIAL APPLICABILITY

Engines, particularly diesel engines, can from time to time experience difficulties when starting, particularly in cold ambient temperatures. One contributing factor is the continuous parasitic loads placed on the engine during start-up. In the present disclosure, a disconnect clutch 100 may be utilized to disconnect parasitic loads 104 from an engine 102 during the initial start-up and to automatically connect the parasitic loads 104 once the engine 102 speed is sufficient to develop the torque capacity that is equal to the load applied on the disconnect clutch 100. In some embodiments, the parasitic loads 104 may be connected after the engine 102 speed reaches a low idle speed during startup and transitions to a higher engine speed.

During initial start-up, the flywheel assembly 106 will rotate with the crankshaft 126 of the engine 102 and fluid from a supply source (for example, engine oil from the engine 102, other lubricating fluids from other sources, or the like) will flow into the chamber 116 through the fill aperture 132. However, the friction plate(s) 108, which are not yet attached to the flywheel assembly 106, will not rotate with the flywheel assembly 106 (and crankshaft 126 of the engine 102) during initial start-up. Thus, because the friction plate(s) 108 are not operably connected yet to the engine 102 via the flywheel assembly 106, the parasitic loads 104 that are operably connected to the friction plate(s) 108 are also not connected to the engine 102. This eliminates the drag that can be produced by parasitic loads 104 on the engine 102 during initial start-up.

As fluid continues to flow into the chamber 116 of the rotating flywheel assembly 106, the fluid, acting under the centrifugal force generated by the rotating flywheel assembly 106, will develop a pressure head in the chamber 116 that exerts pressure on the piston 118 that causes the piston 118 to move to an expanded position 164 (and the volume of the chamber 116 to expand) and the piston 118 nub 152 to exert a contact force C on the lever 122. In embodiments, where the chamber 116 is open at the bottom, (FIGS. 4-5 where there is no ledge 136 extending between the front member 128 and the piston 118) the movement of the piston 118 to the expanded position 164 (and the expansion of the volume of the chamber 116) is caused by the fluid acting under centrifugal force. Whereas, in embodiments in which the chamber 116 is closed (see FIGS. 1-3 where the chamber 116 is closed at the bottom by the ledge 136), the closure of the chamber 116 allows the fluid supply pressure (the pressure of the fluid entering through the fill aperture 132) in addition to the centrifugal force to exert pressure on the piston 118 that moves the piston 118 to the expanded position 164 and the piston 118 nub 152 to exert a contact force C on the lever 122.

The lever 122 applies an activation force A to the protrusion 158 of the pressure plate 120 as a result of the contact force C on the lever. In some embodiments, the lever 122 magnifies the contact force C and transfers that magnified activation force A to the protrusion 158 of the pressure plate 120. Acting under the activation force A, the pressure plate 120 moves toward the friction plate(s) 108 and presses the friction plate(s) 108 against the end plate 124 of the flywheel assembly 106. The activation force A applied by the pressure plate 120 substantially attaches the friction plate(s) 108 to the rotating flywheel assembly 106 (via the pressure plate 120 and the end plate 124) such that the friction plate(s) 108 now rotate with the flywheel assembly 106. At this point, the parasitic loads 104 that are operably connected to the friction plate(s) 108 are also operably connected to the engine 102. Fluid may continue to flow into the chamber 116 through the fill aperture 132. The bleed aperture 134 provides relief for the pressure in the chamber 116 as it allows fluid to flow out of the chamber 116. In some embodiments, fluid flowing out of the chamber 116 may flow via a return conduit 184 back to the fluid supply source. In one embodiment, the time period for the parasitic loads 104 to engage the engine 102, as measured from the beginning of engine 102 start-up, may be between about three seconds to about thirty seconds.

In some embodiments, the flywheel 114 may include the relief aperture 166 disposed between the fill aperture 132 and the bleed aperture 134. When the relief member 196 is in the open position, the relief valve 168 may allow fluid from the chamber 116 to flow out of the chamber 116. In some embodiments, such fluid may enter a relief channel 198 for transmission back to the fluid source. In some embodiments, the relief channel 198 may be fluidly connected to the return conduit 184. In other embodiments, the piston 118 may have an outlet 200 through which fluid may flow to provide pressure relief inside the chamber 116 during rotation of the flywheel assembly 106.

In some embodiments, the disconnect clutch 100 may be part of a disconnect system 170 that disconnects parasitic loads 104 from the engine 102 during idling of the engine 102. This provides for more efficient use of the engine 102 because accessories (parasitic loads) that are not in use do not receive power. The disconnect system 170 may include the disconnect clutch 100 described above, a fluid supply valve 178, a controller 174 and at least one sensor 176. The fluid supply valve 178 may regulate the flow of fluid to the chamber 116 of the flywheel assembly 106. The disconnect system 170 may also be configured to disconnect parasitic loads 104 from an engine 102 during the initial start-up and to automatically connect the parasitic loads 104 once the engine 102 speed is sufficient to develop the torque capacity that is equal to the load applied on the disconnect clutch 100.

Figure 7:
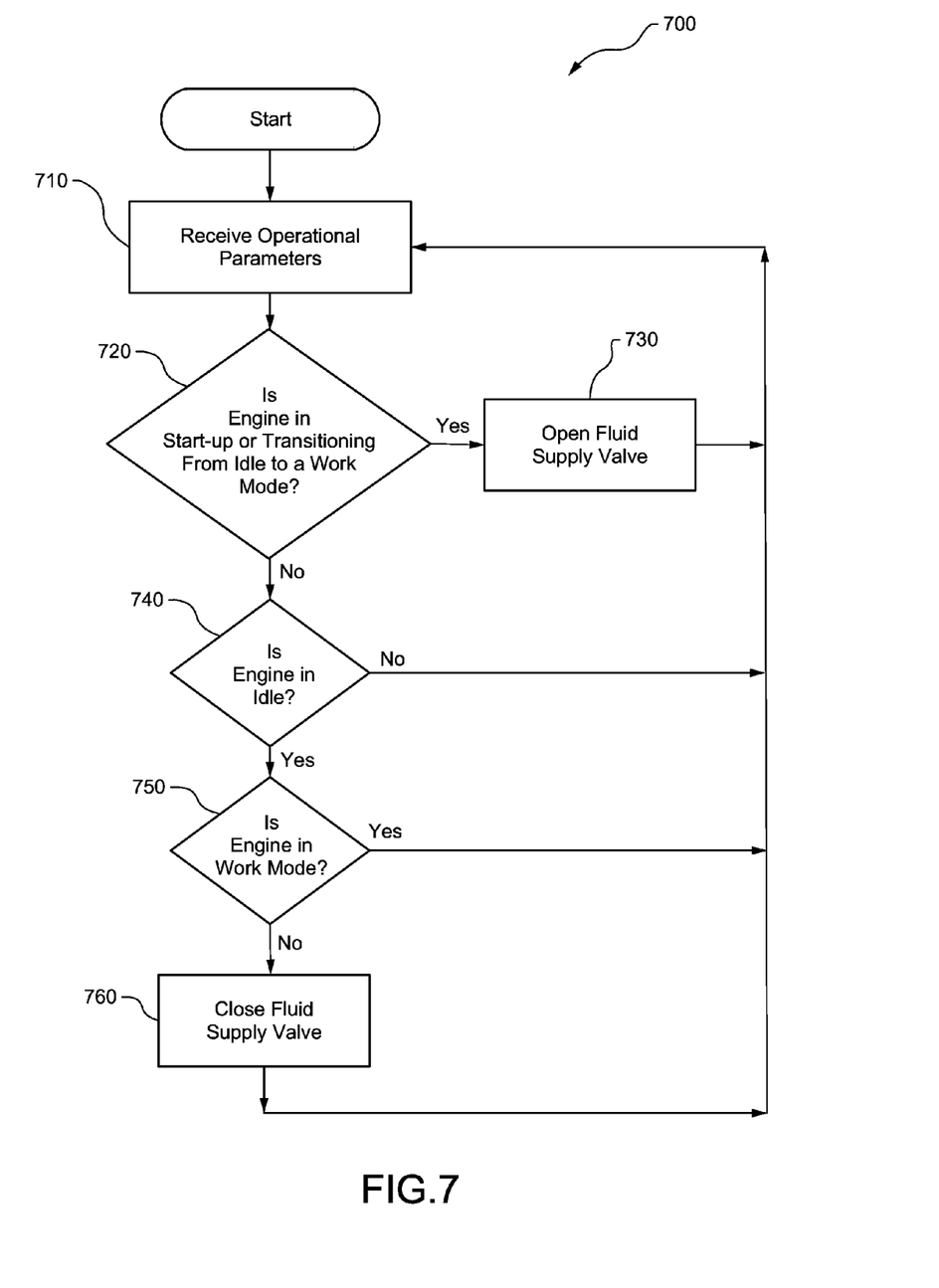
FIG. 7 is a flow chart showing an exemplary process for controlling the connection of parasitic loads to an engine.

FIG. 7 illustrates by way of flowchart an exemplary process 700 using the disconnect system 170 for controlling operation of the disconnect clutch 100.

In block 710, the controller 174 receives from the sensor(s) 176 operational parameters for the engine 102 and/or machine 172. Such operational parameters may include information regarding whether the machine parking brake is on (applied) or released, whether the transmission is in gear, whether there is hydraulic pressure in machine implement hydraulic circuits, engine load, engine speed, whether there is an active start-up command, whether there are active implement commands such as a physical operator lever command, and the like.

In block 720, the controller 174 determines based on the operational parameters received whether the engine 102 is in start-up or is transitioning from idle (the minimum governed speed for the engine 102, plus or minus about ten percent) to a work mode wherein a faster engine 102 speed or load is desired to support machine 172 and/or implement operation. For example, in one embodiment, if the transmission is in gear and/or the parking brake is released, the controller 174 may determine that the engine 102 is transitioning to a work mode. If there is an active physical operator lever command for operation of a machine implement, the controller 174 may determine that the engine 102 is transitioning to a work mode. If the engine 102 had been shut off and there is an active command to start the engine 102, the controller 174 may determine that the engine 102 is in start-up.

If the controller 174 determines based on the operational parameters received that the engine 102 is either in start-up or is transitioning to a work mode, the method proceeds to block 730. If no, the method proceeds to block 740.

If the method proceeds to block 730, the controller 174 sends a control signal to the fluid supply valve 178 to move or maintain the valve member 186 to the open position. In the open position, fluid is allowed to pass through the fluid supply valve 178 into the supply conduit 180 to the chamber 116. As the flywheel assembly 106 continues to rotate, fluid continues to flow into the fill aperture 132 and the disconnect clutch 100 functions as described above to automatically connect or keep connected the parasitic loads 104.

In block 740, the controller 174 determines whether the engine 102 is in idle. If yes, the method proceeds to block 750. If no, the method returns to block 710.

In block 750, the controller 174 determines whether the engine 102 is in work mode. If yes, the method proceeds to block 760. If no, the method returns to block 710.

In block 760, the controller 174 sends a control signal to the fluid supply valve 178 to move the valve member 186 to the closed position. In the closed position, fluid is blocked from passing through the fluid supply valve 178 into the supply conduit 180 to the chamber 116. As the flywheel assembly 106 continues to rotate, fluid continues to flow out of the bleed aperture 134, and the outlet 200 (if there is one). Because no additional fluid is entering the chamber 116, the pressure head of the fluid in the chamber 116 will diminish (because the fluid is draining out and is no longer being supplied) and the piston 118 will move to the contracted position 162. The contact force C and activation force A will diminish as the piston 118 retracts to the contracted position 162. Once the activation force A is no longer large enough to attach the friction plate 108(*s*) to the rotating flywheel 114, the parasitic loads 104 are disconnected from the idling engine 102. The method returns to block 710.

The features disclosed herein may be particularly beneficial to provide efficient engine 102 operation during startup and idle.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A disconnect clutch comprising:
 a flywheel assembly that includes;
  a rotatable flywheel having a cavity, the flywheel including an end plate;
  a chamber disposed inside the cavity and defined by the flywheel and a piston;
  the piston disposed inside the cavity and moveable between a contracted position and an expanded position piston is generally annular and has a piston inner circumference and a piston outer circumference, and in which the flywheel includes a ledge disposed adjacent to the piston inner circumference; and
  a pressure plate disposed inside the cavity;
 a friction plate disposed inside the cavity between the pressure plate and the end plate, the friction plate attached to and rotatable with the flywheel assembly when the piston is in the expanded position and spaced apart from the flywheel assembly and generally stationary when the piston is in the contracted position; and
 a coupling operably connected to the friction plate, further including a lever disposed inside the cavity between the piston and the pressure plate, the lever oriented in relation to the piston and the pressure plate to apply an activation force to the pressure plate when the piston is in the expanded position.

2. The disconnect clutch of claim 1, in which the piston includes a nub disposed outside the chamber.

3. The disconnect clutch of claim 2, wherein the piston is generally annular and has a piston inner circumference, and in which the flywheel includes a ledge disposed under the piston inner circumference.

4. The disconnect clutch of claim 1, in which the flywheel includes a fill aperture and a bleed aperture.

5. The disconnect clutch of claim 1, in which the friction plate is a plurality of friction plates.

6. The disconnect clutch of claim 1, in which the lever is generally annular having a lever inner circumference and a lever outer circumference, and includes a plurality of slits, each slit spaced apart from the other and extending toward the lever outer circumference from the lever inner circumference.

7. A method of controlling the connection of a parasitic load to an engine disposed on a machine, the method comprising:
rotating a flywheel assembly connected to the engine, the flywheel assembly having an interior and including a flywheel, a piston and a chamber disposed in the interior, the chamber defined by the flywheel and the piston, the flywheel assembly further includes a relief valve; and
connecting the engine to the parasitic load by applying an activation force to attach a friction plate disposed inside the interior of the rotating flywheel assembly to the rotating flywheel assembly, the friction plate operably connected to the parasitic load, wherein the activation force is generated by movement of the piston to an expanded position by fluid contained in the chamber, the fluid acting under centrifugal force produced by the rotating.

8. The method of claim 7, further including disconnecting the engine from the parasitic load by draining at least a portion of the fluid from the chamber.

9. The method of claim 7, in which the flywheel assembly further includes a pressure plate disposed adjacent to the friction plate, and a lever disposed between the piston and the pressure plate, the method further including applying by the piston a contact force on the lever, the contact force generated by the movement of the piston to the expanded position by fluid contained in the chamber, the contact force less than the activation force.

10. The method of claim 9, further including magnifying, by the lever, the contact force received from the piston to generate the activation force applied to the pressure plate.

11. The method of claim 7, wherein the flywheel includes a ledge disposed under the piston, the method further including receiving fluid into the chamber; and using centrifugal force acting on the fluid and fluid supply pressure to move the piston to the expanded position.

12. The method of claim 7, further including controlling the flow of fluid to the chamber based on machine or engine operating parameters.

13. A disconnect system operably connected to an engine disposed on a machine, the disconnect system comprising:
a disconnect clutch that includes:
a flywheel assembly that includes;
a rotatable flywheel having a cavity, the flywheel including an end plate;
a chamber disposed in the cavity and defined by the flywheel and a piston;
the piston disposed in the cavity, the piston is generally annular and has a piston inner circumference and a piston outer circumference, and in which the flywheel includes a ledge disposed adjacent to the piston inner circumference, the piston including a nub, the piston moveable between a contracted position and an expanded position;
a pressure plate disposed in the cavity and including a protrusion; and
a lever disposed in the cavity between the piston and the pressure plate, the lever oriented in relation to the piston and the pressure plate to magnify a contact force received from the nub and to apply an activation force to the protrusion when the piston is in the expanded position, the activation force greater than the contact force;
a friction plate disposed inside the flywheel assembly between the pressure plate and the end plate, the friction plate attached to and rotatable with the flywheel assembly when the piston is in the expanded position and disconnected from the flywheel assembly and generally stationary when the flywheel is rotating and the piston is in the contracted position; and
a coupling operably connected to the friction plate and a parasitic load, wherein the parasitic load is connected to the engine when the piston is in the expanded position and the friction plate is attached to and rotating with the flywheel assembly and is disconnected from the engine when the friction plate is disconnected from the flywheel assembly.

14. The disconnect system of claim 13, wherein the nub is disposed outside the chamber between the piston inner circumference and the piston outer circumference.

15. The disconnect system of claim 13, in which the disconnect clutch further includes a seal in sealing engagement between the piston and the ledge.

16. The disconnect system of claim 13, wherein the lever is generally annular with a lever inner circumference and a lever outer circumference, the lever inner circumference disposed radially outward of the piston inner circumference.

17. The disconnect system of claim 13, in which the flywheel further includes a fill aperture and a bleed aperture, and the disconnect system further includes:
a fluid supply valve fluidly connected to the fill aperture, the fluid supply valve including a valve member moveable between an open position and a closed position;
at least one sensor configured to detect machine or engine parameters; and
a controller configured to transmit a control signal to the fluid supply valve to move the valve member to the closed position based upon at least one machine parameter detected by the sensor.

\* \* \* \* \*